United States Patent
Hou et al.

(10) Patent No.: US 11,599,682 B2
(45) Date of Patent: Mar. 7, 2023

(54) TERMINAL DEVICE, METHOD AND APPARATUS FOR UNLOCKING SCREEN OF TERMINAL DEVICE

(71) Applicant: Chipone Technology (Beijing) Co., Ltd., Beijing (CN)

(72) Inventors: Lijie Hou, Beijing (CN); Lida Zhang, Beijing (CN); Chenming Gao, Beijing (CN); Xin Wang, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/961,244

(22) PCT Filed: Apr. 2, 2019

(86) PCT No.: PCT/CN2019/081076
§ 371 (c)(1),
(2) Date: Jul. 9, 2020

(87) PCT Pub. No.: WO2020/001115
PCT Pub. Date: Jan. 2, 2020

(65) Prior Publication Data
US 2021/0110072 A1    Apr. 15, 2021

(30) Foreign Application Priority Data

Jun. 25, 2018 (CN) .......................... 201810663533.6

(51) Int. Cl.
*G06F 21/84* (2013.01)
*G06F 3/04883* (2022.01)
*G06F 21/31* (2013.01)

(52) U.S. Cl.
CPC .......... *G06F 21/84* (2013.01); *G06F 3/04883* (2013.01); *G06F 21/31* (2013.01); *G06F 2221/2149* (2013.01)

(58) Field of Classification Search
CPC ...... G06F 3/04883; G06F 21/83; G06F 21/84; G06F 21/31
See application file for complete search history.

(56) References Cited

U.S. PATENT DOCUMENTS

| 2012/0042364 A1* | 2/2012 | Hebert | G06F 21/554 |
| | | | 726/6 |
| 2013/0080960 A1* | 3/2013 | McRae | G06F 3/048 |
| | | | 715/772 |

(Continued)

FOREIGN PATENT DOCUMENTS

| CN | 102999216 A | 3/2013 |
| CN | 105740002 | 7/2016 |

(Continued)

*Primary Examiner* — Andrea C Leggett
(74) *Attorney, Agent, or Firm* — Treasure IP Group, LLC (57) ABSTRACT

The present disclosure relates to a terminal device, a method and apparatus for unlocking a screen of the terminal device. The terminal device comprises a touch and display chip; the method is used on the touch and display chip and comprises: when the terminal device is in a dormant state, displaying a screen unlocking interface on the screen if touch information is detected on the screen; acquiring unlocking information for unlocking the screen via the screen unlocking interface; and unlocking the screen when the unlocking information is consistent with corresponding verification information. The terminal device, the method and apparatus for unlocking the screen of the terminal device according to the present disclosure greatly reduce the power consumption of the terminal device, and save battery power. Furthermore, the touch and display chip enables user verification during unlocking process to be securer.

11 Claims, 9 Drawing Sheets

(56) References Cited

U.S. PATENT DOCUMENTS

2014/0115690 A1\* 4/2014 Huang .................. G06F 21/36
                                                              726/16
2014/0304664 A1    10/2014 Lee et al.
2015/0372810 A1\* 12/2015 Miller .................. H04L 9/0822
                                                              713/183
2018/0101297 A1\*  4/2018 Yang ..................... G06F 3/0482
2019/0156012 A1\*  5/2019 Zheng .................... G06F 21/36

FOREIGN PATENT DOCUMENTS

| CN | 106055947   | 10/2016 |
| CN | 106127908 A | 5/2017  |
| CN | 106648255   | 5/2017  |
| CN | 109032675   | 12/2018 |

\* cited by examiner

TERMINAL DEVICE, METHOD AND APPARATUS FOR UNLOCKING SCREEN OF TERMINAL DEVICE

CROSS-REFERENCE TO RELATED APPLICATIONS

This Application is a Section 371 National Stage Application No. PCT/CN2019/081076, filed on Apr. 2, 2019, entitled "Terminal Device, Method and Apparatus For Unlocking Screen Of Terminal Device", which published as WO 2020001115 A1, on Jan. 2, 2020, and claims priority to Chinese Patent Application No. 201810663533.6, filed on Jun. 25, 2018, the contents of which are incorporated herein by reference in their entireties.

FIELD OF TECHNOLOGY

The present disclosure relates to the technical field of display control, in particular to a terminal device, a method and apparatus for unlocking a screen of the terminal device.

BACKGROUND

The low power consumption design of a portable device such as a smart phone and the like has attracted much attention. The power consumption of a main control application processor in the portable device is high. Although the power consumption is low when in a dormant state, the main control application processor is comparatively slow to switch in and out of the dormant state.

When the main control application processor unlocks a portable device and verifies a user, the main control application processor needs to activate a plurality of functional modules, such as an internal CPU, a graphics processing unit (GPU), a double data rate SDRAM (DDR SDRAM) and the like, and needs to drive a display screen and receive an input touch, so as to eliminate a false trigger, determine the validity of the user, and finally wake up the portable device. In the process, a system on chip (SoC) is activated completely, which consumes a lot of power.

SUMMARY

In view of the existing status, the present disclosure provides a terminal device, a method and apparatus for unlocking a screen of the terminal device. The screen of the terminal device in a dormant state is unlocked via a touch and display chip, thus greatly reducing the power consumption of the terminal device, and saving battery power. Furthermore, the touch and display chip is easy to generate a position-random keyboard and abundant unlocking gestures, thus enabling user verification during unlocking process to be securer.

According to one aspect of the present disclosure, provided is a method for unlocking a screen of a terminal device; the terminal device comprises a touch and display chip; the method is used on the touch and display chip, and comprises: when the terminal device is in a dormant state, displaying a screen unlocking interface on the screen if touch information is detected on the screen; acquiring unlocking information for unlocking the screen via the screen unlocking interface; and unlocking the screen when the unlocking information is consistent with corresponding verification information.

In an alternative embodiment, the unlocking information comprises one or much of the following information: gesture information, password information and fingerprint information.

In an alternative embodiment, the screen unlocking interface comprises content for acquiring the unlocking information; wherein step of displaying the screen unlocking interface on the screen comprises: displaying the content for acquiring the unlocking information in any area on the screen.

In an alternative embodiment, wherein step of displaying the screen unlocking interface on the screen comprises: acquiring an encryption level of the terminal device; and displaying the screen unlocking interface on the screen according to the encryption level.

In an alternative embodiment, further comprising: controlling the terminal device to operate in a waking state if the screen is successfully unlocked.

According to another aspect of the present disclosure, provided is an apparatus for unlocking a screen of a terminal device; the terminal device comprises a touch and display chip; the apparatus is applied to the touch and display chip, and comprises: a display control module, configured to display a screen unlocking interface on the screen if touch information is detected on the screen when the terminal device is in a dormant state; an unlocking information acquisition module, configured to acquire unlocking information for unlocking the screen via the screen unlocking interface; and a verification module, configured to unlock the screen when the unlocking information is consistent with corresponding verification information.

In an alternative embodiment, the unlocking information comprises one or much of the following information: gesture information, password information and fingerprint information.

In an alternative embodiment, the screen unlocking interface comprises content for acquiring the unlocking information; wherein the display control module comprises: a first display control unit, configured to displaying the content for acquiring the unlocking information in any area on the screen.

In an alternative embodiment, wherein the display control module comprises: an encryption level acquisition unit, configured to acquire an encryption level of the terminal device; and a second display control unit, configured to display the screen unlocking interface on the screen according to the encryption level.

In an alternative embodiment, the apparatus further comprises: a waking control module, configured to control the terminal device to operate in a waking state if the screen is successfully unlocked.

According to another aspect of the present disclosure, provided is a terminal device, comprising a touch and display chip, wherein the touch and display chip is used to execute the above-described method.

According to another aspect of the present disclosure, provided is an apparatus for unlocking a screen of a terminal device, comprising: a processor, and a memory for storing executable instruction of the processor, wherein the processor is configured to execute the above-described method.

According to another aspect of the present disclosure, provided is a non-volatile computer readable storage medium, storing a computer program instruction, wherein the computer program instruction is configured to realize the above-described method, when the computer program executed by a processor.

The screen of the terminal device in a dormant state is unlocked via the touch and display chip. The terminal device, the method and apparatus for unlocking the screen of the terminal device according to the embodiments of the present disclosure do not need to activate the entire SoC system in the process of unlocking the screen, and reduce the times of wakening a main control processor from the dormant state, thus greatly reducing the power consumption of the terminal device, and saving battery power. Furthermore, the touch and display chip is easy to generate a position-random keyboard and abundant unlocking gestures, thus enabling user verification during unlocking process to be securer.

The other features and aspects of the present disclosure will become apparent according to the following detailed description on exemplary embodiments with reference to the drawings.

BRIEF DESCRIPTION OF THE DRAWINGS

The drawings contained in the specification and forming a part of the specification, together with the specification, show the exemplary embodiments, features and aspects of the present disclosure, and are used to explain the principle of the present disclosure.

DESCRIPTION OF THE EMBODIMENTS

Various exemplary embodiments, features and aspects of the present disclosure will be described in detail hereafter with reference to the drawings. The same reference signs in the drawings denote elements having the same or similar functions. The drawings show various aspects of the embodiments. However, unless otherwise stated, the drawings are not necessarily drawn in proportion.

The term "exemplary" herein means "use as an example, an embodiment or an instance". Any embodiment described herein as an "exemplary" embodiment is not necessarily explained to be superior to or better than other embodiments.

In addition, in order to still better describe the present disclosure, numerous specific details are provided in the following descriptions of the specific embodiments. A person skilled in the art should understand that the present disclosure can still be implemented without certain specific details. In some embodiments, in order to highlight the subject matter of the present disclosure, the method, means, element and circuit well known to a person skilled in the art are not described in detail.

Figure 1:
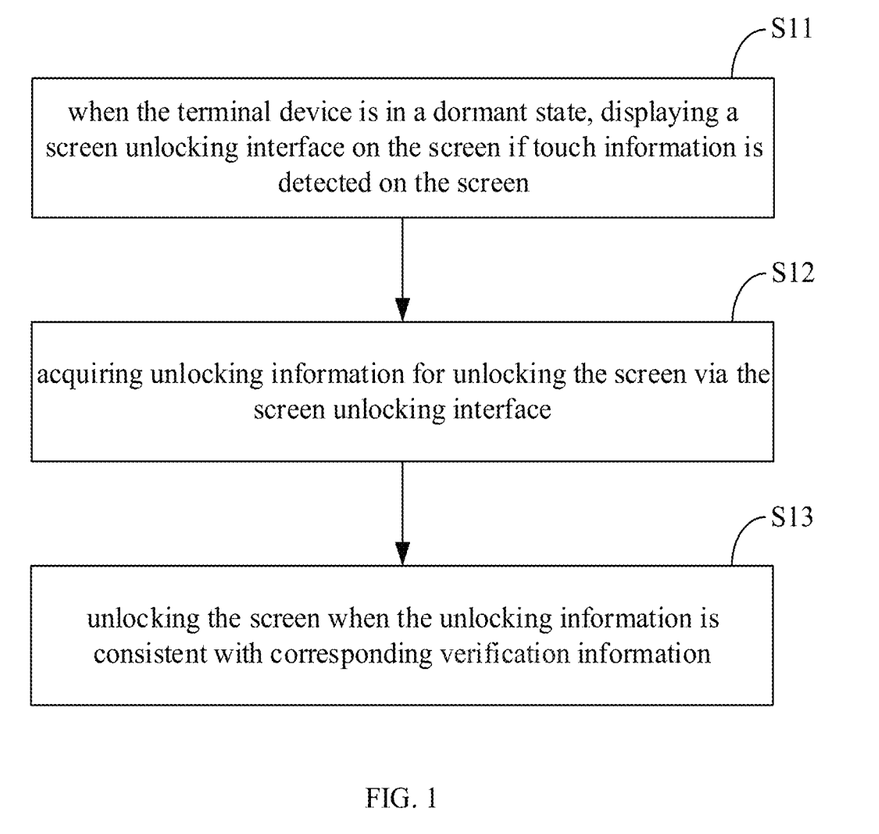
FIG. 1 shows a flow chart of the method for unlocking a screen of a terminal device according to one embodiment of the present disclosure.

FIG. 1 shows a flow chart of the method for unlocking a screen of a terminal device according to one embodiment of the present disclosure; The terminal device comprises a touch and display chip; the method is used on the touch and display chip; as shown in FIG. 1, the method comprises: Step S11, when the terminal device is in a dormant state, displaying a screen unlocking interface on the screen if touch information is detected on the screen.

The terminal device can be a mobile phone, a personal digital assistant (PDA), a computer and the like; under the situation that the terminal device does not operate, the terminal device can be in the dormant state (screen locked state); if a user wants to use the terminal device in the dormant state, the user should unlock the screen first.

Wherein the touch information can be any touch operation of the user on the screen with a finger or a stylus pen. The screen unlocking interface can be an interface for checking the identity of the user.

When the terminal device is in the dormant state, the touch and display chip of the terminal device is in a low power consumption scanning mode; when the user touches the screen causing great change to the capacitance of the screen, the touch and display chip can detect touch information on the screen, and can display a screen unlocking interface on the screen. The screen unlocking interface may comprise an icon, an image, a password keyboard, a gesture keyboard and the like.

Figure 2:
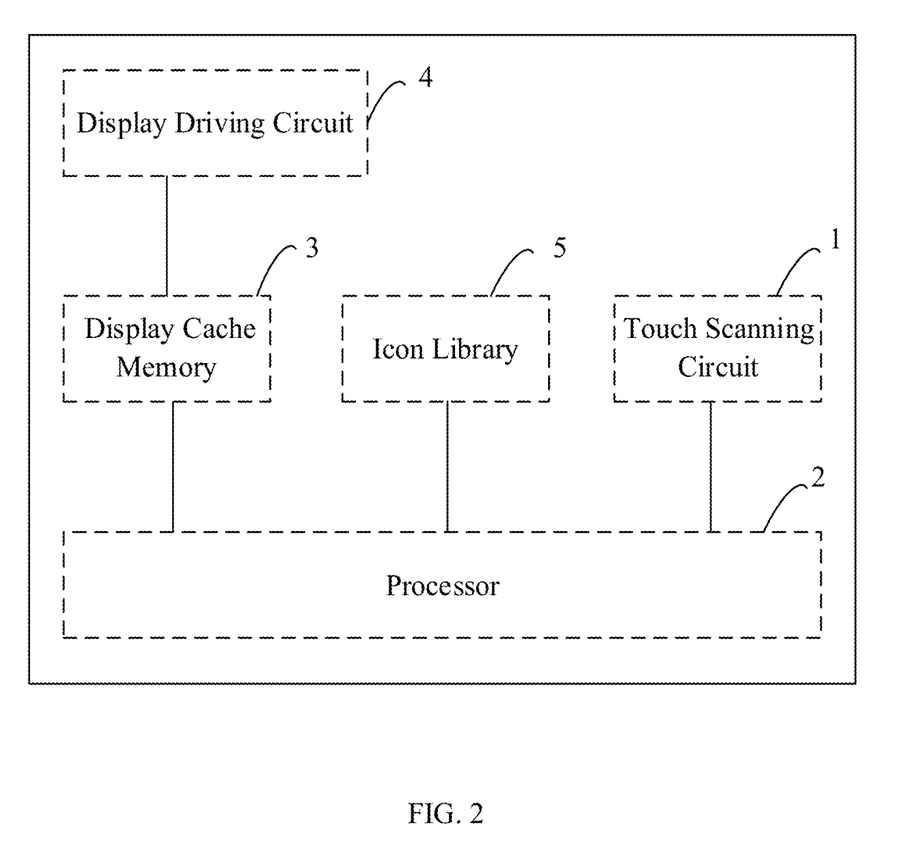
FIG. 2 shows a structural block diagram of the touch and display chip.

As an example, as shown in FIG. 2, when the terminal device is in the dormant state, the touch and display chip is in the low power consumption scanning mode; after a touch scanning circuit 1 senses a great capacitance change (for example, touch with a finger) of a touch screen (touch panel), the processor 2 in the touch and display chip initializes a display cache memory 3, acquires an icon or an image from an icon library 5, and stores the icon or the image in the display cache memory 3; then processor 2 activates a display driving circuit 4, displays a screen unlocking interface on the screen, and displays the icon or the image acquired from the icon library 5 on the screen unlocking interface.

The method further comprises Step S12, acquiring unlocking information for unlocking the screen via the screen unlocking interface.

The unlocking information can be information inputted by the user on the screen unlocking interface, for example, one or many gestures formed by the user on the screen according to a moving icon or image, or a password inputted by the user and the like.

The touch and display chip can acquire the unlocking information by scanning the screen unlocking interface. As shown in FIG. 2, the touch scanning circuit 1 can acquire capacitance distribution information of the touch screen; then the processor 2 analyzes a touch scanning result acquiring a precise finger position, for example finger coordinates; and the processor 2 can calculate a corresponding gesture according to the value and variation of the finger coordinates.

The method further comprises Step S13, unlocking the screen when the unlocking information is consistent with corresponding verification information.

Wherein the verification information may be standard information capable of unlocking the screen. In one example, the verification information may be information used for unlocking the screen and generated when the touch and display chip displays the screen unlocking interface on the screen; alternatively, in another example, the verification information may be information for unlocking the screen preset by the user, for example, an unlocking gesture, an unlocking password preset by the user.

The touch and display chip can determine whether the acquired unlocking information is consistent with the corresponding verification information; if consistent, the touch and display chip unlocks the screen; and if inconsistent, the touch and display chip can prompt the user to re-input the unlocking information.

The screen of the terminal device in the dormant state is unlocked via the touch and display chip. The method for unlocking the screen of the terminal device according to the embodiments of the present disclosure does not need to activate the entire SoC system in the process of unlocking the screen, and reduces the times of wakening a main control processor from the dormant state, thus greatly reducing the power consumption of the terminal device, and saving battery power. Furthermore, the touch and display chip is easy to generate a position-random keyboard and abundant unlocking gestures, thus enabling user verification during unlocking process to be securer.

In an alternative embodiment, the unlocking information may comprise one or more of the following information: gesture information, password information and fingerprint information.

FIG. 3-6 shows schematic views of the screen unlocking interface according to embodiments of the present disclosure. FIG. 7 shows a flow chart of the method for unlocking a screen of a terminal device according to one embodiment of the present disclosure; As shown in FIG. 7, in an alternative embodiment, the screen unlocking interface comprises content for acquiring the unlocking information.

Step S11, displaying a screen unlocking interface on the screen may comprise:

Step S111, displaying the content for acquiring the unlocking information in any area on the screen.

The content for acquiring the unlocking information can be the content for inputting the unlocking information by the user. The content for acquiring the unlocking information may comprise one or many of an input area, an icon, an image, an icon or image display track, a keyboard and the like.

Figure 5:
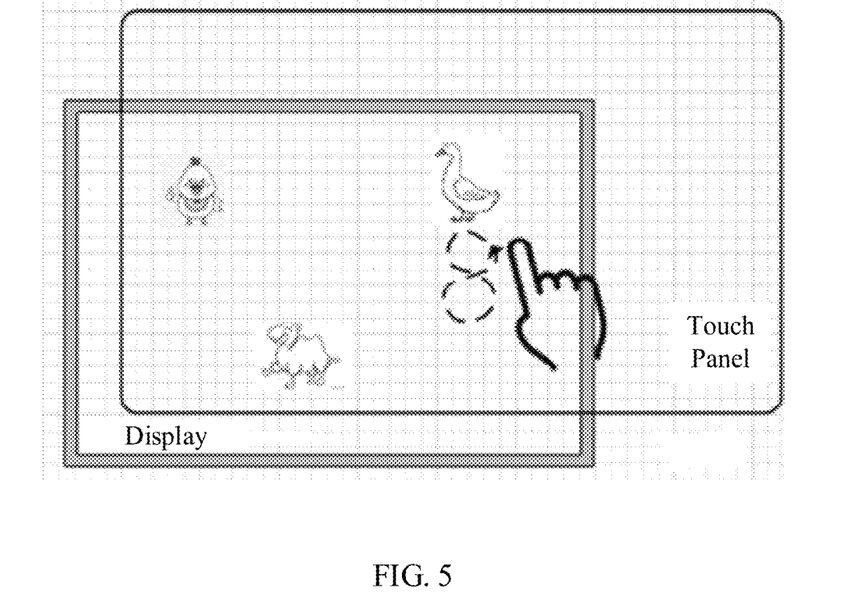
FIG. 5 shows a schematic view of the screen unlocking interface according to one embodiment of the present disclosure.

The input area may comprise a password input area, as shown in FIG. 5, or may further comprise an area for inputting sequential characters or images, or a fingerprint input area.

The touch and display chip can control the content for acquiring the unlocking information displayed in any area on the screen. As shown in FIG. 3-6, a chicken, a duck, a camel, and display tracks corresponding to the chicken, the duck and the camel can be dispersively displayed on the screen; and a numeric keyboard can also be dispersively displayed on the screen.

Figure 3:
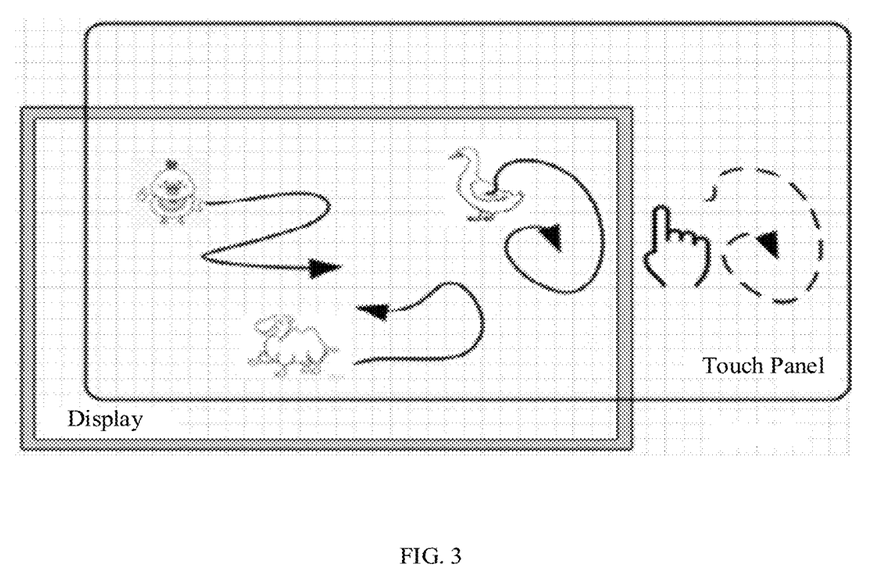
FIG. 3 shows a schematic view of the screen unlocking interface according to one embodiment of the present disclosure.

As shown in FIG. 3, the content for acquiring the unlocking information can be images of the chicken, the duck and the camel, and the display tracks corresponding to the chicken, the duck and the camel. A finger of the user can move according to the display track of the duck to form a gesture; and the touch and display chip can determine the gesture to be unlocking information.

Figure 4:
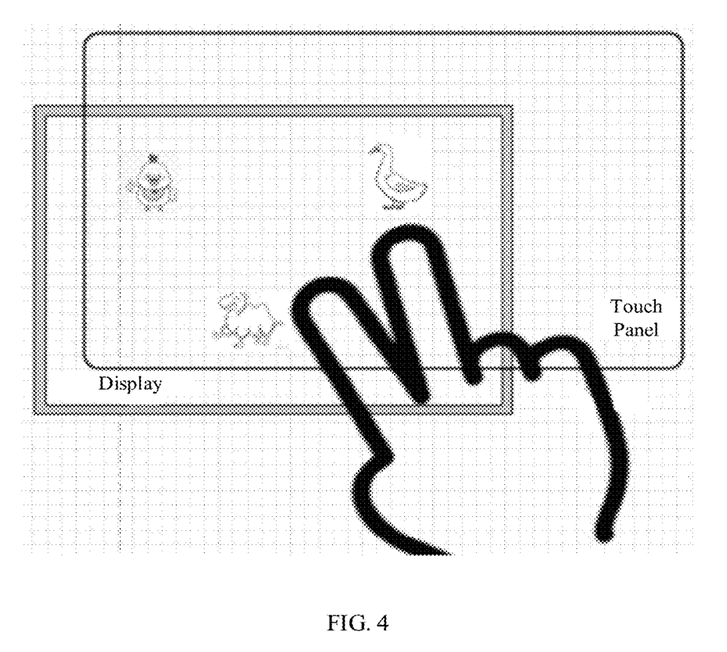
FIG. 4 shows a schematic view of the screen unlocking interface according to one embodiment of the present disclosure.

As shown in FIG. 4, the content for acquiring the unlocking information is images of the chicken, the duck and the camel. The user can touch the duck and the camel with two fingers to form a gesture; and the touch and display chip can determine the gesture to be unlocking information.

As shown in FIG. 5, the content for acquiring the unlocking information can be the chicken, the duck and the camel. The user can sequentially draw preset gestures of the chicken, the duck and the camel starting from the duck to form a gesture; and the touch and display chip can determine the gesture to be unlocking information.

The content for acquiring the unlocking information can be a numeric keyboard and a password input box. The user can utilize the numeric keyboard to input a password; and the touch and display chip can acquire the password from the password input box as unlocking information, wherein the numeric keyboard can be a 0-9 numeric keyboard; alternatively, the quantity of the numbers in the numeric keyboard can also be random, for example the quantity can be six as shown in FIG. 6; furthermore, the numbers in the numeric keyboard can be all the numbers in a password preset by the user, and can also be a part of the numbers in the password preset by the user and other numbers apart from the password.

Figure 6:
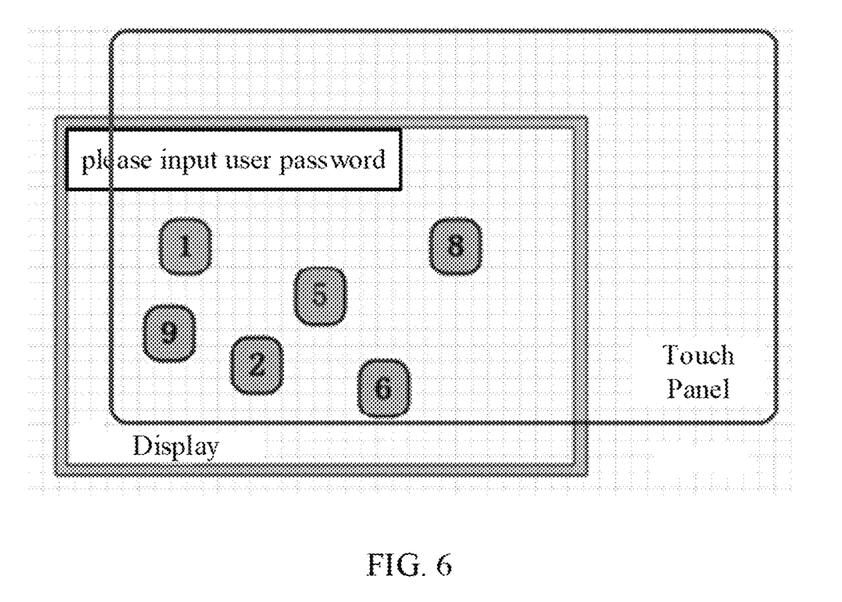
FIG. 6 shows a schematic view of the screen unlocking interface according to one embodiment of the present disclosure.
Figure 7:
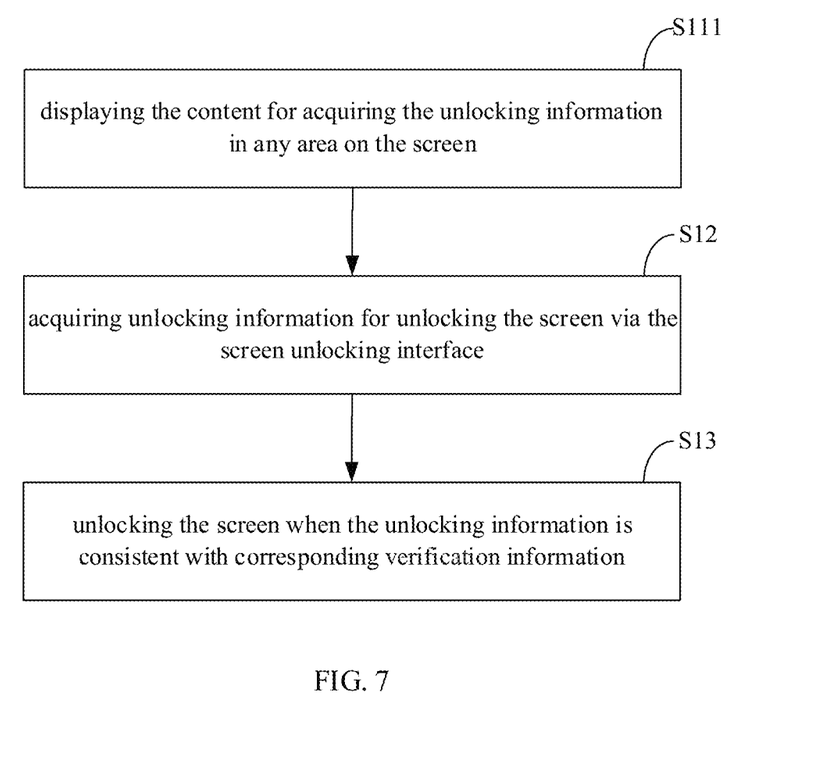
FIG. 7 shows a flow chart of the method for unlocking a screen of a terminal device according to one embodiment of the present disclosure.

For example, if the password preset by the user is 741358 and the touch and display chip detects touch information on the screen when the terminal device is in the dormant state, then the touch and display chip can display the numeric keyboard on the screen according to the password preset by the user; the quantity of the numbers in the numeric keyboard can be the same as the digit of the password preset by the user; the numbers in the numeric keyboard may comprise a part of the numbers in the password preset by the user; as shown in FIG. 6, the user can filter out from the numeric keyboard all the numbers contained in the password preset by the user: 1, 5 and 8, and sequentially clicks 1, 5 and 8 in the numeric keyboard according to the sequence of 1, 5 and 8 in the password; and if the touch and display chip determines that 1, 5 and 8 inputted by the user are all the numbers in the password contained in the numeric keyboard and that the input sequence is correct, then the touch and display chip unlocks the screen.

The quantity of the numbers in the numeric keyboard is variable, and the numbers in the numeric keyboard may comprise a part of the numbers in the password. Therefore, the input difficulty of the password is adjustable. Furthermore, the numeric keyboard displayed each time is different, thus preventing the hazards of password leaks.

Figure 8:
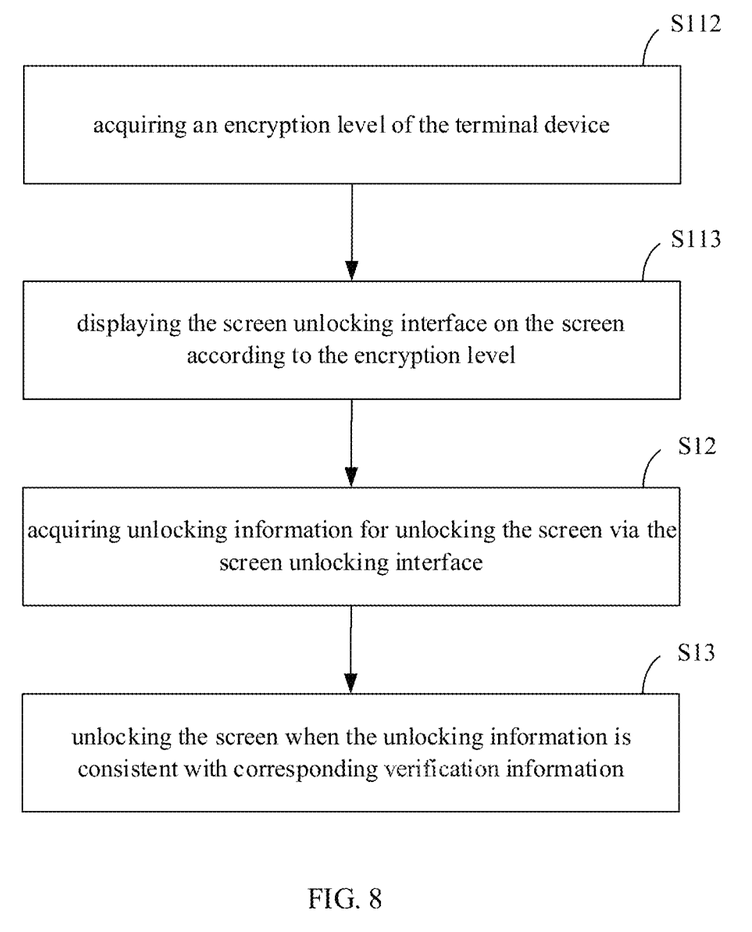
FIG. 8 shows a flow chart of the method for unlocking a screen of a terminal device according to one embodiment of the present disclosure.

FIG. 8 shows a flow chart of the method for unlocking a screen of a terminal device according to one embodiment of the present disclosure; As shown in FIG. 8, in an alternative embodiment, step S11 to display a screen unlocking interface on the screen, may comprise: step S112, for acquiring an encryption level of the terminal device.

Encryption levels can be divided according to screen unlocking modes of the terminal device. For example, supposing that the screen unlocking mode of a terminal device A is a preset gesture, the screen unlocking mode of a terminal device B is a password, and the screen unlocking mode of a terminal device C is a fingerprint, the three terminal devices can be sequenced in the order A, B and C according to the encryption levels from low to high, and the corresponding encryption levels are an encryption level 1, an encryption level 2 and an encryption level 3.

The touch and display chip can acquire the screen unlocking mode of the terminal device, and the encryption level of the terminal device.

It should be noted that if the terminal device sets two screen unlocking modes, for example, a terminal device D sets two screen unlocking modes: a preset gesture and a password, then the touch and display chip can acquire, according to the two screen unlocking modes, two encryption levels of the terminal device D: encryption level 1 and encryption level 2.

The method may further comprise Step S113, for displaying the screen unlocking interface on the screen according to the encryption level.

The touch and display chip acquires the encryption level 1 of the terminal device A, and can display the screen unlocking interface as shown in FIG. 3-5 on the screen. The user can directly input the preset gesture into the screen unlocking interface as unlocking information, and does not need to memorize the password.

Alternatively, the touch and display chip acquires the encryption level 2 of the terminal device B, and can display the screen unlocking interface as shown in FIG. 6 on the screen.

Alternatively, when the terminal device has two encryption levels, the touch and display chip can display the screen unlocking interface on the screen according to the higher one of the two encryption levels. For example, when the encryption level of the terminal device D comprises an encryption level 1 and an encryption level 2, the touch and display chip can display the screen unlocking interface as shown in FIG. 6 on the screen according to the encryption level 2.

The description above is only an example showing how to display the screen unlocking interface on the screen according to an encryption level, which is not defined by the present disclosure, as long as the security level of the screen unlocking interface is matched with the encryption level of the terminal device.

It should be noted that the step S111 can also be executed after the step S113.

Figure 9:
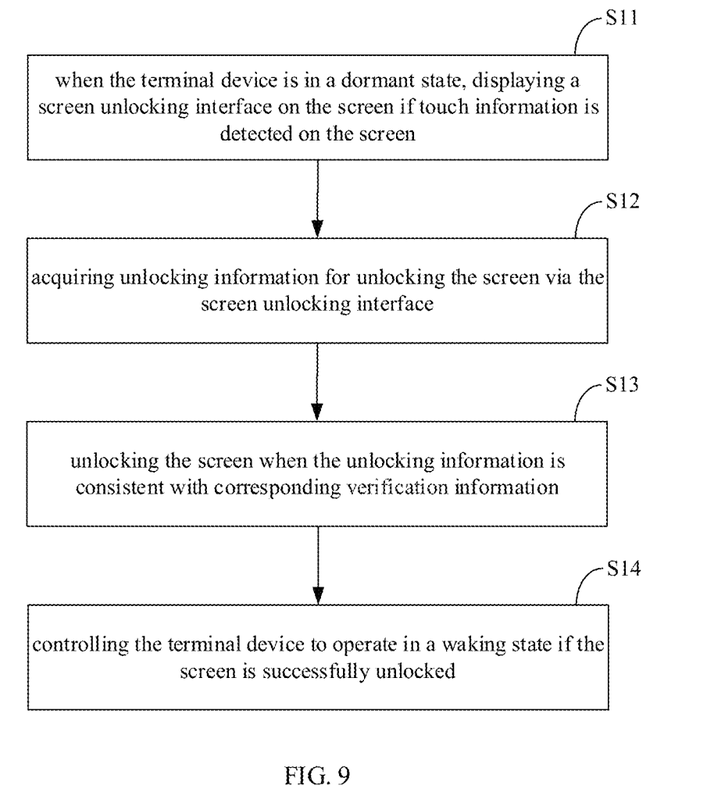
FIG. 9 shows a flow chart of the method for unlocking a screen of a terminal device according to one embodiment of the present disclosure.

FIG. 9 shows a flow chart of the method for unlocking a screen of a terminal device according to one embodiment of the present disclosure; As shown in FIG. 9, in an alternative embodiment, the method may further comprise: Step S14, controlling the terminal device to operate in a waking state if the screen is successfully unlocked.

If the screen is successfully unlocked, the touch and display chip can activate the main control application processor, CPU, GPU, DDR and the like in the terminal device, such that the entire system on chip (SoC) can be activated to control the terminal device to enter the waking state from the dormant state.

In an alternative embodiment, provided is a terminal device, comprising a touch and display chip, wherein the touch and display chip is used to execute the above-described method.

Figure 10:
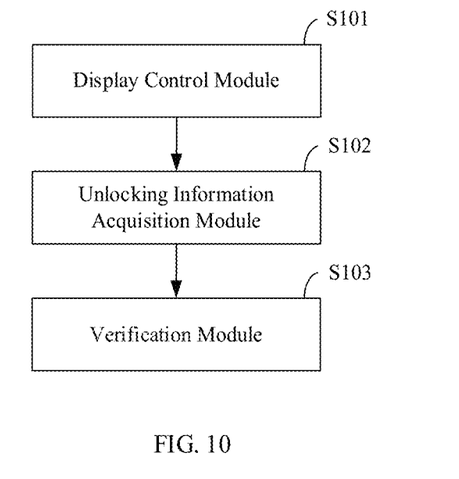
FIG. 10 shows a block diagram of the apparatus for unlocking a screen of a terminal device according to one embodiment of the present disclosure.

FIG. 10 shows a block diagram of the apparatus for unlocking a screen of a terminal device according to one embodiment of the present disclosure; the terminal device may comprise a touch and display chip; the apparatus may be applied to the touch and display chip; as shown in FIG. 10, the apparatus comprises: a display control module 101, configured to display a screen unlocking interface on a screen if touch information is detected on the screen when the terminal device is in a dormant state; an unlocking information acquisition module 102, configured to acquire unlocking information for unlocking the screen via the screen unlocking interface; and a verification module 103, configured to unlock the screen when the unlocking information is consistent with corresponding verification information.

The screen of the terminal device in the dormant state is unlocked via the touch and display chip. The apparatus for unlocking the screen of the terminal device according to the embodiments of the present disclosure does not need to activate the entire SoC system in the process of unlocking the screen, and reduces the times of wakening a main control processor from the dormant state, thus greatly reducing the power consumption of the terminal device, and saving battery power. Furthermore, the touch and display chip is easy to generate a position-random keyboard and abundant unlocking gestures, thus enabling user verification during unlocking process to be securer.

In an alternative embodiment, the unlocking information comprises one or much of the following information: gesture information, password information and fingerprint information.

Figure 11:
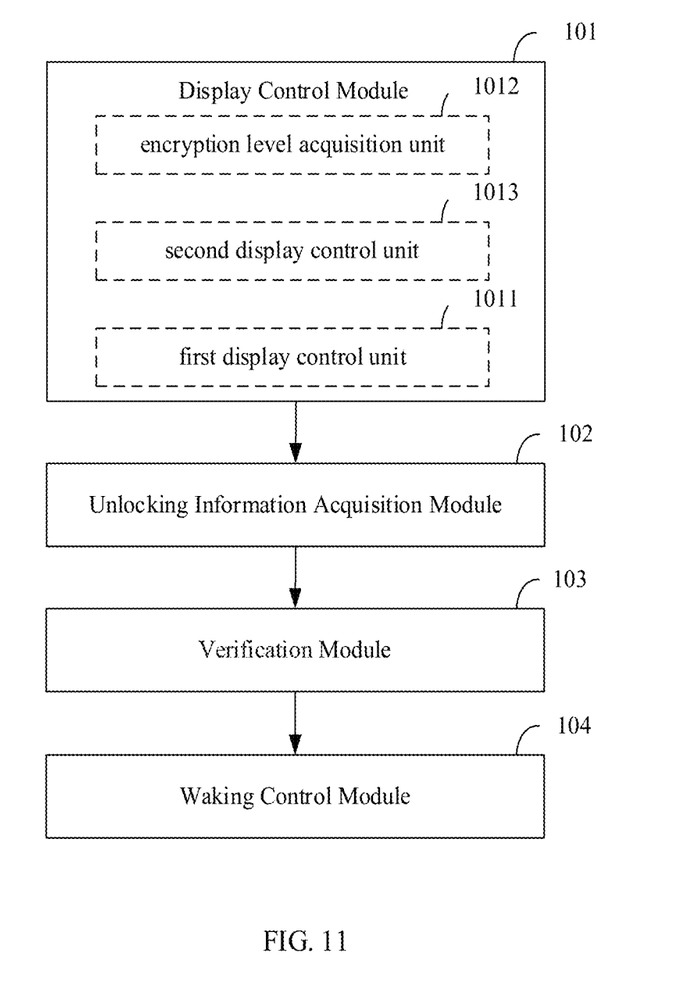
FIG. 11 shows a block diagram of the apparatus for unlocking a screen of a terminal device according to one embodiment of the present disclosure.

FIG. 11 shows a block diagram of the apparatus for unlocking a screen of a terminal device according to one embodiment of the present disclosure; as shown in FIG. 11, in an alternative embodiment, the screen unlocking interface comprises content for acquiring the unlocking information; the display control module 101 comprises: a first display control unit 1011, configured to display the content for acquiring the unlocking information in any area on the screen.

As shown in FIG. 11, in an alternative embodiment, the display and control module 101 comprises: an encryption level acquisition unit 1012, configured to acquiring an encryption level of the terminal device; and a second display control unit 1013, configured to display the screen unlocking interface on the screen according to the encryption level.

As shown in FIG. 11, in an alternative embodiment, the apparatus further comprises: waking control module 104, configured to control the terminal device in a waking state if the screen is successfully unlocked.

Figure 12:
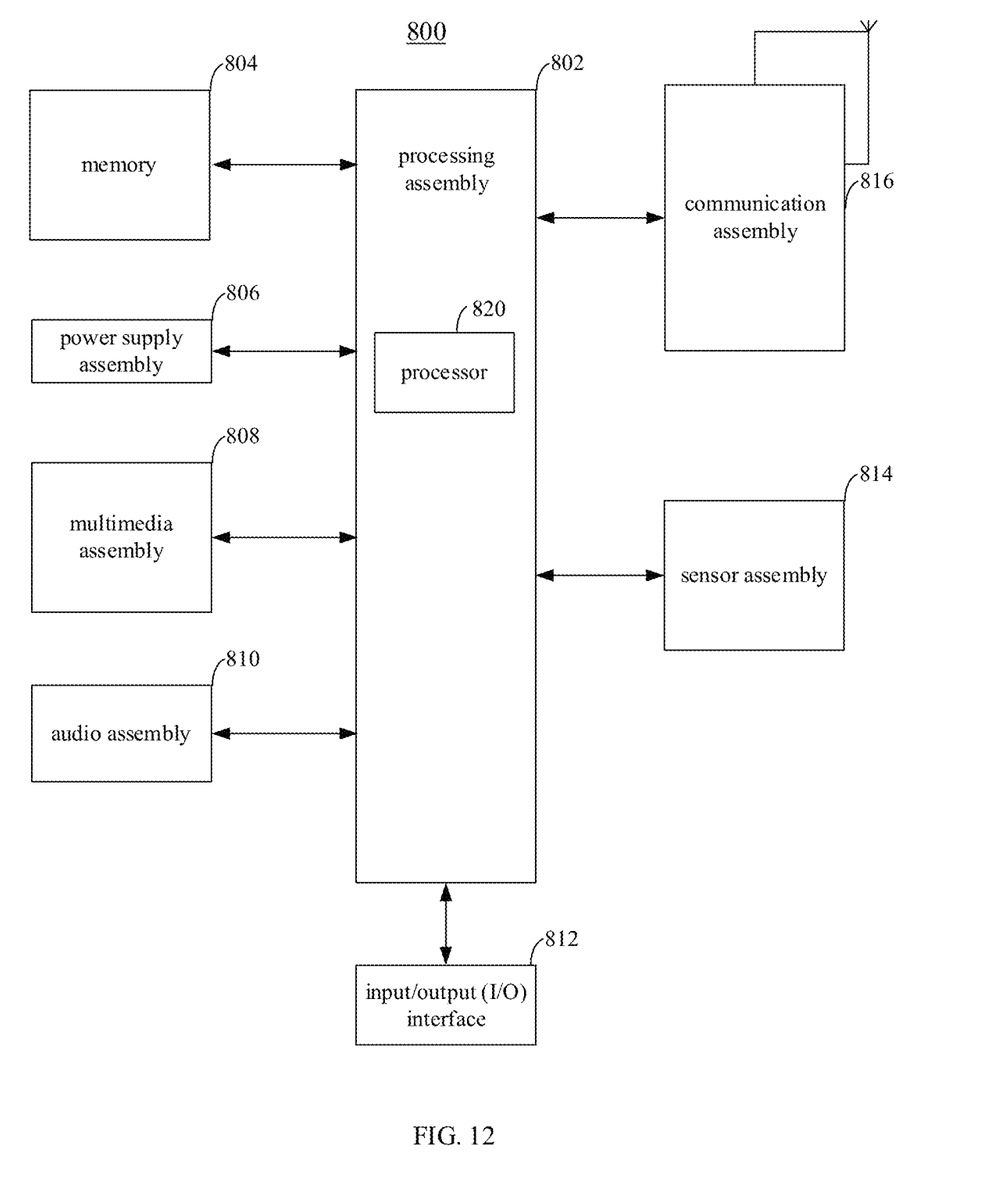
FIG. 12 shows a block diagram of the apparatus for unlocking a screen of a terminal device according to one embodiment of the present disclosure.

FIG. 12 is a block diagram of the apparatus 800 for unlocking a screen of a terminal device according to an exemplary embodiment. For example, the apparatus 800 can be a mobile telephone, a computer, a digital broadcast terminal, a message receiving and transmitting device, a game console, a tablet device, a medical device, a body building device, a personal digital assistant and the like.

With reference to FIG. 12, the apparatus 800 may comprise one or more of the following assemblies: a processing assembly 802, a memory 804, a power supply assembly 806, a multimedia assembly 808, an audio assembly 810, an input/output (I/O) interface 812, a sensor assembly 814, and a communication assembly 816.

The processing assembly 802 generally controls the overall operations of the apparatus 800, such as the operations associated with display, phone calling, data communication, camera operation and recording operation. The processing assembly 802 may comprise one or more processors 820 to execute instructions to complete the whole or a part of the steps of the method. In addition, the processing assembly 802 may comprise one or more modules, facilitating the interaction between the processing assembly 802 and other assemblies. For example, the processing assembly 802 may comprise a multimedia module, facilitating the interaction between the multimedia assembly 808 and the processing assembly 802.

The memory 804 is configured to store various types of data to support the operations of the apparatus 800. For example, the data comprise an instruction, contact data, telephone directory data, a message, an image, a video and the like for operating any application programs or methods on the apparatus 800. The memory 804 can be any types of volatile or non-volatile storage devices, or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk or an compact disk.

The power supply assembly 806 supplies power to each assembly of the apparatus 800. The power supply assembly 806 may comprise a power supply management system, one or more power supplies, and other assemblies for generating, managing and allocating power for the apparatus 800.

The multimedia assembly 808 comprises a screen for providing an output interface between the apparatus 800 and the user. In some embodiments, the screen may comprise a liquid crystal display (LCD) and a touch panel (TP). If the screen comprises a touch panel, then the screen can be realized as a touch screen to receive an input signal from the user. The touch panel comprises one or more touch sensors to sense a touch, a slide and a gesture on the touch panel. The touch sensor not only can sense a boundary of a touch or a slide action, but also can detect a duration and a pressure related to the touch or the slide operation. In some embodiments, the multimedia assembly 808 comprises a front camera and/or a rear camera. When the apparatus 800 is in an operating mode, for example, a photographing mode or a video mode, the front camera and/or the rear camera can receive external multimedia data. Each one of the front camera and the rear camera can be a fixed optical lens system or can have a focal length and an optical zoom capability.

The audio assembly 810 is configured to output and/or input an audio signal. For example, the audio assembly 810 comprises a microphone (MIC) configured to receive an external audio signal when the apparatus 800 is in an operating mode, such as a calling mode, a recording mode and a voice recognition mode. The received audio signal can be further stored in the memory 804, or transmitted via the communication assembly 816. In some embodiments, the audio assembly 810 further comprises a loudspeaker for outputting the audio signal.

The I/O interface 812 provides an interface between the processing assembly 802 and a peripheral interface module, wherein the peripheral interface module can be a keyboard, a click wheel, a button and the like. The button may comprise but not limited to a homepage button, a volume button, an activation button and a lock button.

The sensor assembly 814 comprises one or more sensors for supplying various aspects of state evaluations to the apparatus 800. For example, the sensor assembly 814 can detect an on/off state of the apparatus 800 and the relative positions of the assemblies, wherein the assemblies are a display and a small keyboard of the apparatus 800; the sensor assembly 814 can further detect the position change of the apparatus 800 or an assembly of the apparatus 800, whether the user contacts the apparatus 800, the orientation or acceleration/de-acceleration of the apparatus 800, and the temperature change of the apparatus 800. The sensor assembly 814 may comprise a proximity sensor configured to detect whether an object exists nearby when no physical contact is detected. The sensor assembly 814 may further comprise a light sensor, such as a CMOS or a CCD image sensor, for use in an imaging application. In some embodiments, the sensor assembly 814 may further comprise an acceleration sensor, a gyroscope sensor, a magnetic sensor, a pressure sensor or a temperature sensor.

The communication assembly 816 is configured to facilitate the wired or wireless communication between the apparatus 800 and other apparatuses. The apparatus 800 can access a communication standard based wireless network, such as WiFi, 2G or 3G, or a combination thereof. In an exemplary embodiment, the communication assembly 816 receives a broadcast signal or broadcast related information from an external broadcast management system via a broadcast channel. In an exemplary embodiment, the communication assembly 816 further comprises a near field communication (NFC) module for achieving short range communication. For example, the NFC module can be realized on the basis of a radio frequency identification (RFID) technology, an infrared data association (IrDA) technology, an ultrawide band (UWB) technology, a Bluetooth (BT) technology and other technologies.

In an exemplary embodiment, the apparatus 800 can be realized by one or more application-specific integrated circuits (ASIC), a digital signal processor (DSP), a digital signal processing device (DSPD), a programmable logic device (PLD), a field-programmable gate array (FPGA), a controller, a microcontroller, a microprocessor or other electronic elements, and is used to execute the method.

In an exemplary embodiment, further provided is a non-volatile computer readable storage medium, comprising, for example, a memory 804 having stored therein a computer program instruction for, when executed by the processor 820 of the apparatus 800, completing the above-described method.

The present disclosure can be a system, a method and/or a computer program product. The computer program product may comprise a computer readable storage medium having stored therein computer readable program instructions for the processor to realize various aspects of the present disclosure.

The computer readable storage medium can be a physical device capable of retaining and storing an instruction for use by an instruction execution device. The computer readable storage medium, for example, can be but not limited to an electrical storage device, a magnetic storage device, an optical storage device, an electromagnetic storage device, a semiconductor storage device or any appropriate combinations thereof. More specific examples (non-exhaustively listed) of the computer readable storage medium comprise: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital video disk (DVD), a memory stick, a floppy disk, a mechanical encoding device, an in-groove protrusion structure or a punch card having stored therein an instruction, and any appropriate combinations thereof. The computer readable storage medium used herein is not explained as an instantaneous signal, such as a radio wave or other freely transmitted electromagnetic waves, an electromagnetic wave transmitted via a waveguide or other transmission medium (for example, a light pulse passing an optical fiber cable), or an electrical signal transmitted via an electric wire.

The computer readable program instruction described herein can be downloaded from the computer readable storage medium to a computing/processing device, or downloaded to an external computer or an external storage device via a network, such as an Internet, a local area network, a wide area network and/or a wireless network. The network may comprise a copper transmission cable, an optical fiber transmitter, a wireless transmitter, a router, a firewall, a switch, a gateway computer and/or an edge server. A network adapter card or a network interface in each computing/processing device receives the computer readable program instruction from the network, and forwards the computer readable program instruction, so as to store the computer readable program instruction in the computer readable storage medium of the computing/processing device.

The computer program instruction for executing the operations of the present disclosure can be an assembly instruction, an instruction set architecture (ISA) instruction, a machine instruction, a machine related instruction, a micro-code, a firmware instruction, state setting data, or a source code or a target code compiled with any combinations of one or more programming languages; the programming languages comprise object oriented programming languages such as Smalltalk, C++ and the like, and conventional procedural programming languages such as the "C" language, or similar programming languages. The computer readable program instruction can be completely executed on a user computer, partially executed on the user computer, executed as an independent software packet, executed partially on the user computer and partially on a remote computer, or completely executed on the remote computer or a server. In the case of involving a remote computer, the remote computer can be connected to the user computer via any types of networks, such as a local area network (LAN) or a wide area network (WAN), or can be connected to an external computer (for example, via an Internet provided by an Internet service supplier). In some embodiments, a personal electronic circuit, such as a programmable logic circuit, a field-programmable gate array (FPGA) or a pro logic array (PLA), is customized by utilizing the state information of the computer readable program instruction; the electronic circuit can execute the computer readable program instruction to realize various aspects of the present disclosure.

Various aspects of the present disclosure are described herein with reference to the flow charts and/or block diagrams of the method, device (system) and computer program product according to the embodiments of the present disclosure. It should be understood that each block in the flow charts and/or the block diagrams can be combined with another block in the flow charts and/or the block diagrams via computer readable program instructions.

The computer readable instructions can be supplied to the processors of a general-purpose computer, a specialized computer, or other programmable data processing devices, so as to produce a machine, such that when the instruction is executed by the processors of the computers or other programmable data processing devices, a device for realizing a specified function/action in one or more blocks in the flow charts and/or the block diagrams can be generated. The computer readable program instructions can also be stored in a computer readable storage medium; the instructions enable a computer, a programmable data processing device and/or other devices to operate in a specific mode; therefore, the computer readable medium having stored the instructions is a product comprising various instructions for realizing a specified function/action in one or more blocks in the flow charts and/or the block diagrams.

The computer readable program instructions can also be loaded to a computer, other programmable data processing devices, or other devices, such that a series of operation steps can be executed on the computer, other programmable devices or other devices to generate a computer realizable process; therefore, the computer, other programmable devices or other devices can execute the instructions to realize a specified function/action in one or more blocks in the flow charts and/or the block diagrams.

The flow charts and the block diagrams in the drawings show a system architecture, functions and operations that the system, method and computer program product according to multiple embodiments of the present disclosure may realize. In this respect, each block in the flow charts or the block diagrams may represent a module, a program segment or a part of an instruction; the module, the program segment or a part of an instruction comprise one or more executable instructions for realizing a specified logic function. In an alternative implementation, the functions marked in the blocks can also occur in an order different from the sequence in the drawings. For example, two sequent blocks actually can be executed basically in parallel, and sometimes can also be executed in a reverse order, which depends on the involved functions. It should be further noted that each block in the block diagrams and/or the flow charts, and a combination of the blocks in the block diagrams and/or the flow charts can be realized via a hardware based system specially for executing a specified function or action, or via a combination of special hardware and a computer instruction.

The embodiments of the present disclosure are already described above. The descriptions above are illustrative but not exhaustive, and are not limited to the disclosed embodiments. Numerous modifications and changes will be apparent to a person skilled in the art without departing from the scope and spirit of the illustrated embodiments. The terms used herein are intended to explain the principle and practical use of each embodiment or a technical improvement in the prior art, or intended to enable a person skilled in the art to understand the embodiments disclosed herein.

What is claimed is:

1. A method for unlocking a screen of a terminal device comprising a touch and display chip, wherein the method is used on the touch and display chip and comprises:
    when the terminal device is in a dormant state, displaying a screen unlocking interface on the screen if touch information is detected on the screen;
    acquiring unlocking information for unlocking the screen via the screen unlocking interface;
    unlocking the screen when the unlocking information is consistent with corresponding verification information; and
    controlling a system on chip be activated to control the terminal device to enter the waking state from the dormant state when the screen is unlocked,
    wherein the screen unlocking interface comprises a numeric keyboard which is variable, the verification information comprises a password with a plurality of different numbers, and numbers in the numeric keyboard consist essentially of a part of numbers in the plurality of different numbers of the password and other numbers apart from the plurality of different numbers of the password,
    when the unlocking information consists of all of numbers in the plurality of different numbers of the password in correct sequence, the screen is unlocked, and the unlocking information is less than the verification information.

2. The method according to claim 1, wherein the unlocking information comprises one or much of the following information:
    gesture information, password information and fingerprint information.

3. The method according to claim 1, wherein the screen unlocking interface comprises content for acquiring the unlocking information;
    wherein step of displaying the screen unlocking interface on the screen comprises:
    displaying the content for acquiring the unlocking information in any area on the screen.

4. The method according to claim 1, wherein step of displaying the screen unlocking interface on the screen comprises:
    acquiring an encryption level of the terminal device; and
    displaying the screen unlocking interface on the screen according to the encryption level.

5. A terminal device, comprising a touch and display chip, wherein the touch and display chip is used to execute the method as claimed in claim 1.

6. An apparatus for unlocking a screen of a terminal device, comprising:
    a processor; and
    a memory for storing executable instruction of the processor,
    wherein the processor is configured to:
    execute the instruction to realize the method as claimed in claim 1.

7. A non-volatile computer readable storage medium storing a computer program instruction, wherein the computer program instruction is configured to realize the method as claimed in claim 1, when the computer program is executed by a processor.

8. An apparatus for unlocking a screen of a terminal device comprising a touch and display chip, wherein the apparatus is applied to the touch and display chip and comprises:
    a display control module, configured to display a screen unlocking interface on the screen if touch information is detected on the screen when the terminal device is in a dormant state;
    an unlocking information acquisition module, configured to acquire unlocking information for unlocking the screen via the screen unlocking interface; and
    a verification module, configured to unlock the screen when the unlocking information is consistent with corresponding verification information, and control a system on chip be activated to control the terminal device to enter the waking state from the dormant state when the screen is unlocked,
    wherein the screen unlocking interface comprises a numeric keyboard which is variable,
    the verification information comprises password with a plurality of different numbers, and numbers in the numeric keyboard consist of a part of numbers in the plurality of different numbers of the password and other numbers apart from the plurality of different numbers of the password,
    when the unlocking information consists of all of numbers in the plurality of different numbers of the password in correct sequence % the screen is unlocked, and the unlocking information is less than the verification information.

9. The apparatus according to claim 8, wherein the unlocking information comprises one or much of the following information:
    gesture information, password information and fingerprint information.

10. The apparatus according to claim 8, wherein the screen unlocking interface comprises content for acquiring the unlocking information;
    wherein the display control module comprises:
    a first display control unit, configured to display the content for acquiring the unlocking information in any area on the screen.

11. The apparatus according to claim 8, wherein the display control module comprises:
    an encryption level acquisition unit, configured to acquire an encryption level of the terminal device; and
    a second display control unit, configured to display the screen unlocking interface on the screen according to the encryption level.

* * * * *